US008182098B2

(12) United States Patent
Bratishchev et al.

(10) Patent No.: US 8,182,098 B2
(45) Date of Patent: May 22, 2012

(54) PROJECTION OPTICAL SYSTEM

(75) Inventors: Alexey Vladimirovich Bratishchev, Moscow (RU); Irina Vladimirovna Sergievskaya, Moscow (RU); Maria Valerievna Potapova, Moscow (RU); Yung-jun Park, Yongin-si (KR); Sang-hyun Sohn, Yongin-si (KR); Kirill Sergeevich Sokolov, Suwon-si (KR); Sang-soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 12/034,338

(22) Filed: Feb. 20, 2008

(65) Prior Publication Data
US 2008/0252855 A1 Oct. 16, 2008

(30) Foreign Application Priority Data

Feb. 20, 2007 (RU) .................................. 2007106115
Feb. 19, 2008 (KR) ........................ 10-2008-0015024

(51) Int. Cl.
G03B 21/28 (2006.01)
G02B 9/62 (2006.01)
(52) U.S. Cl. .......................................... 353/81; 359/756
(58) Field of Classification Search .............. 353/30–37, 353/81, 98, 101, 102, 119; 349/5–8; 359/365, 359/366, 649, 650, 651, 708, 714, 717, 793, 359/795, 749–762
See application file for complete search history.

(56) References Cited

U.S. PATENT DOCUMENTS

| 3,348,901 | A | * | 10/1967 | Hudson | 359/769 |
| 3,784,287 | A | * | 1/1974 | Grey | 359/790 |
| 3,862,796 | A | * | 1/1975 | De Jager | 359/766 |
| 6,425,667 | B1 | | 7/2002 | Haba et al. | |
| 6,439,726 | B1 | | 8/2002 | Piehler | |
| 6,560,041 | B2 | * | 5/2003 | Ikeda et al. | 359/749 |
| 6,652,105 | B1 | | 11/2003 | Peterson et al. | |
| 7,614,754 | B2 | * | 11/2009 | Liu et al. | 353/98 |
| 2002/0027720 | A1 | * | 3/2002 | Nishikawa et al. | 359/678 |
| 2003/0133080 | A1 | | 7/2003 | Ogawa et al. | |
| 2006/0164607 | A1 | | 7/2006 | Morejon et al. | |
| 2006/0164857 | A1 | | 7/2006 | Morejon et al. | |
| 2007/0081258 | A1 | * | 4/2007 | Huang | 359/715 |
| 2007/0206390 | A1 | * | 9/2007 | Brukilacchio et al. | 362/555 |
| 2008/0068715 | A1 | * | 3/2008 | Magarill | 359/583 |

FOREIGN PATENT DOCUMENTS

DE 10142353 A1 3/2003
WO 2006/073148 A1 7/2006

OTHER PUBLICATIONS

Communication dated Jan. 18, 2012, issued by the European Patent Office in counterpart European Application No. 08151702.1.

* cited by examiner

*Primary Examiner* — Georgia Y Epps
*Assistant Examiner* — Don Williams
(74) *Attorney, Agent, or Firm* — Sughrue Mion, PLLC

(57) ABSTRACT

Provided is a projection optical system. The projection optical system includes: A projection optical system comprising: a first optical part that comprises at least one optical lens, and projects and displays light beams; a second optical part that comprises an image forming element and at least one optical lens, and emits incident light beams as light beams with images; and a third optical part that comprises a light source unit and a deflector that is located between the first and second optical parts, and directs light beams emitted from the light source unit to the second optical part and directs the light beams with images emitted from the second optical part to the first optical part.

11 Claims, 3 Drawing Sheets

PROJECTION OPTICAL SYSTEM

CROSS-REFERENCE TO RELATED PATENT APPLICATION

This application claims priority from Russian Patent Application No. 2007106115, filed on Feb. 20, 2007 in the Russian Intellectual Property Office, and Korean Patent Application No. 10-2008-0015024, filed on Feb. 19, 2008 in the Korean Intellectual Property Office, the disclosure of both of which are incorporated by reference in its entirety.

BACKGROUND OF THE INVENTION

1. Field of the Invention

The present invention relates generally to a projection optical system, and more particularly, to a projection optical system in which brightness of images projected on a screen and brightness uniformity can be improved.

2. Description of the Related Art

Projection optical systems are optical systems in which light emitted from a light source takes the shape of light beams of the required cross-section and aperture, thereby providing uniformity of illumination, and is then projected on a screen via an objective. In recent image projection systems, a micro-mirror element is used as an optical element for forming images. The micro-mirror element is a set of rotary mirrors, for example, a digital micro-mirror device (DMD). The optical system of these image projection systems includes an illumination optical element for homogenous illumination on the set of rotary mirrors and a projection optical element, such as an objective for displaying images on a screen.

As an example of conventional projection optical systems, U.S. Pat. No. 6,688,748 discloses an image projection system including: an illumination source for emitting an illumination beam; a reflective display device for modulating the illumination beam to form a reflected imaging beam; a projection objective group having an optical axis; and a field lens group. Herein, the field lens group is decentered with respect to the optical axis of the projection objective group to redirect the reflected imaging beam along an optical path parallel to the optical axis of the projection objective group. In an embodiment of the invention disclosed in U.S. Pat. No. 6,688,748, the reflective display device is disposed on the optical axis of the projection objective group, and the redirected portion of the optical path of the reflected imaging beam is coincident with the optical axis of the projection objective group. In another embodiment of the invention disclosed in U.S. Pat. No. 6,688,748, the display device is tilted with respect to the optical axis of the projection objective group to accommodate the tilt in focal plane of the projection objective group caused by the redirection of the reflected imaging beam.

However, the drawback of the image projection system is that separation of pupils of projection and illumination elements is difficult due to deficiency of free space in a projection objective near an aperture diaphragm (AD). Due to the problems, the overlap of the pupils occurs and a part of beams is lost. As a result, the brightness of images formed in the image projection system decreases and heterogeneity of the images increases.

As another example of conventional projection optical systems, U.S. Pat. No. 6,439,726 discloses a projection optical system in which light emitted from a light source is directed onto a surface by a first optical element, so that an image is formed which can be detected by a second optical element. The projection optical system includes first, second and third optical parts. The first and second optical parts have an optical axis as a common optical axis and form a second optical element. The light coming from the third optical part is incident on the second optical part at a predetermined angle relative to the common optical axis. At this angle, the third optical part lies outside of an area traversed by the light reflected by the reflecting surface from the second optical part to the first optical part.

However, this projection optical system has problems as follows. Compact projection optical systems have a large diagonal of projected images, while they have a small distance from a projector and a screen. In the system, images are projected outside an optical axis of the optical system for convenience of viewers, so that shadows of the viewers do not fall on the screen. For this purpose, if the projector stands on a table, the screen should be located above the optical axis of the optical system, and if the projector is installed on a ceiling, the screen should be located below the optical axis of the optical system. To generate images on the screen located outside of the optical axis of the optical system, an asymmetric projection objective is used in the optical system. Herein, a set of rotary mirrors is vertically shifted relative to the optical axis of an objective. This is because it is necessary to significantly increase adjustable field of vision. An adjustable area of an object, that is, an area located on the plane of the set of rotary mirrors, can be two and even three times more than useful field of vision equal, as a rule, to the size of the set of rotary mirrors. This causes large complexities in calculation of an objective, and corrections of distortion and aberration. Thus, times and costs in calculation and manufacturing of the optical system increase, and its dimension also increases.

SUMMARY OF THE INVENTION

The present invention provides a projection optical system which has a reduced dimension and is manufactured at a low cost, and in which the brightness of images formed by the projection optical system and uniformity thereof are increased.

According to an aspect of the present invention, there is provided a projection optical system comprising: a first optical part that comprises at least one optical lens, and projects and displays light beams; a second optical part that comprises an image forming element and at least one optical lens, and emits incident light beams as light beams with images; and a third optical part that comprises a light source unit and a deflector that is located between the first and second optical parts, and directs light beams emitted from the light source unit to the second optical part and directs the light beams with images emitted from the second optical part to the first optical part.

The deflector may be an optical prism comprising a transparent prism body and a reflective layer formed on one surface of the surfaces of the prism body.

The image forming element, which is a reflective image forming element, may be a micro-mirror element or a liquid crystal on silicon (LCOS).

The first optical part, which comprises at least one optical lens serially located in a direction of the second optical part, may comprise: a first lens that is formed of optical plastic and has two aspherical surfaces; a meniscus lens that has a concave surface facing the second optical part; a second lens that is formed of optical plastic and has two aspherical surfaces; and biconvex singlet lens.

The second optical part, which comprises at least one optical lens located between the image forming element and the deflector, may comprise: a meniscus lens that has a concave surface facing the plane of the image forming element; and a triplet lens.

The light source unit may comprise: a plurality of light sources of different colors; and a color-light synthesis element that synthesizes the light beams emitted from the light sources.

Advantages of the projection optical system according to the present invention are as follows.

First, pupils in the projection optical system are satisfactorily separated, and thus brightness of images projected on a screen and brightness uniformity can be improved.

Second, the number of optical elements used in the projection optical system is reduced to simplify the manufacturing process and reduce the manufacturing costs.

Third, the total dimension of the projection optical system can be decreased.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
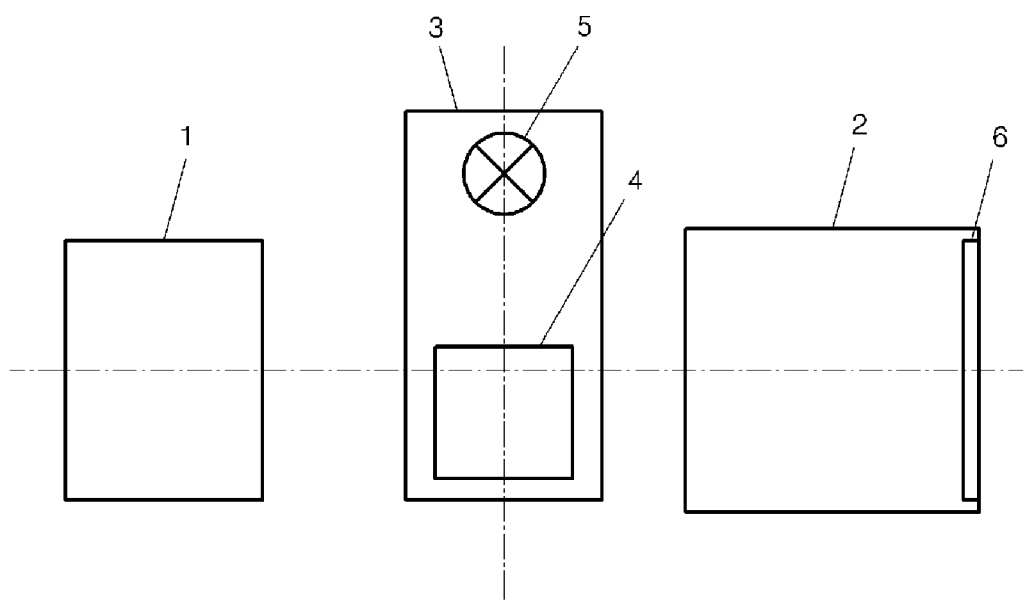
FIG. 1 is a schematic diagram of a projection optical system according to an embodiment of the present invention.

Hereinafter, exemplary embodiments of the present invention will be described more fully with reference to the accompanying drawings. However, the invention should not be construed as being limited to the embodiments set forth herein. Rather, these embodiments are provided so that this disclosure will fully convey the concept of the invention to those skilled in the art. Like reference numerals in the drawings denote like elements. In the drawings, sizes of each element may be exaggerated for clarity and convenience of explanation.

FIG. 1 is a schematic diagram of a projection optical system according to an embodiment of the present invention. Referring to FIG. 1, the projection optical system according to the current embodiment of the present invention includes a first optical part 1, a second optical part 2, and a third optical part 3. Each of the first, second and third optical parts 1, 2 and 3 includes at least one optical lens. The optical lenses of the first and second optical parts 1 and 2 may be a projection objective. The second optical part 2 includes a micro-mirror element 6. The third optical part 3 includes a deflector 4 positioned between the first and second optical parts 1 and 2, and functions as an illuminator.

The micro-mirror element 6 is a set of micro-mirrors that is arranged on a plane and can be individually rotated, for example, a digital micro-mirror device (DMD). The micro-mirror element 6 is an example of reflective image forming elements. Alternatively, a reflective LCD such as a reflective liquid crystal on silicon (LCOS), or other reflective modulators can be used instead of the micro-mirror element 6. Further, the reflective image forming element can be in the combination of a transmissive image forming element and mirrors.

The first and second optical parts 1 and 2 together compose projection objective, that is, projection optical elements, which enable images formed on a reflecting surface of the micro-mirror element 6 to be displayed on a screen. The second optical part 2 is also used for illumination. That is, the optical lenses of the second optical part 2 direct illumination light beams that are generated from a light source unit 5 of the third optical part 3 and directed by the deflector 4 to the micro-mirror element 6.

The first optical part 1 may be in a relocatable form, which can focus images on different working distances in order to receive various sizes of images. That is, to focus the images on different working distances, the first optical part 1 may be installed in such a manner that the position of the optical lenses of the first optical part 1 is adjustable, or the optical lenses thereof can be replaced.

Figure 2:
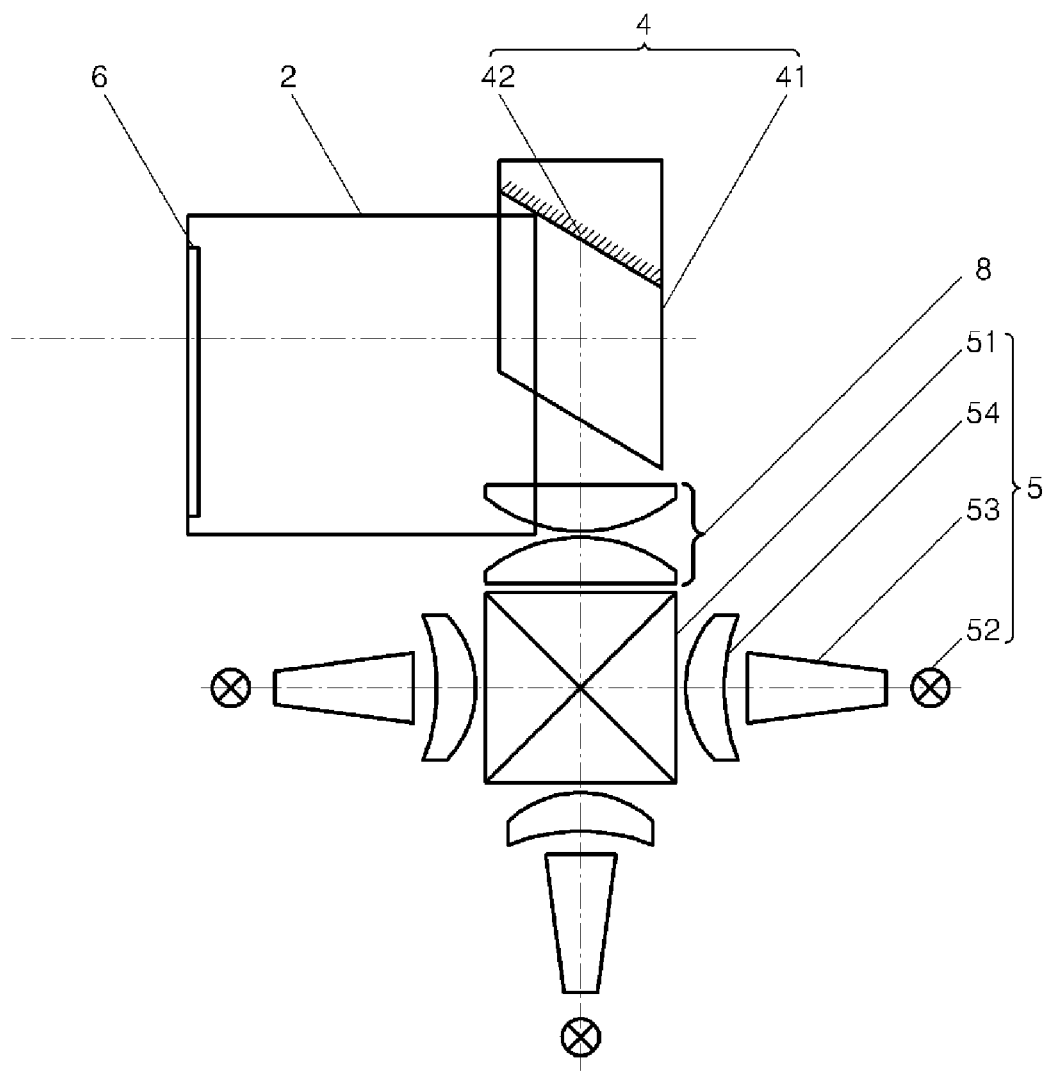
FIG. 2 is a schematic diagram illustrating a third optical part illustrated in FIG. 1, according to an embodiment of the present invention.

The third optical part of the projection optical system of FIG. 1 will be described more fully with reference to FIG. 2. Referring to FIG. 2, the third optical part includes the deflector 4, adjusting lenses 8 and the light source unit 5 that are serially located. The optical axis of the third optical part may be located almost perpendicular to the optical axis of the first and second optical parts, but, the present invention is not limited thereto.

The deflector 4 may be an optical prism including a transparent prism body 41 and a reflective layer 42 formed on one surface of the surfaces of the prism body 41. By using such a transparent optical prism, the beam smearing in the reflective layer 42 can be compensated, and enhance brightness uniformity at the micro-mirror element 6, especially at its corners.

The adjusting lenses 8 are located between the deflector 4 and the light source unit 5, and adjust light beams emitted from the light source unit 5, thereby enabling the light beams emitted from the third optical part to have the required shape and numerical aperture of light beams in the projection optical system.

The light source unit 5 includes a color-light synthesis element 51 and three light sources 52. The light source unit 5 may further include concentrators 53 and focusing lenses 54. The three light sources 52 emits light beams of different colors, and for example, may be respectively a red light source, a green light source, and a blue light source. The color-light synthesis element 51 can be an X-cube used when beams are separated and synthesized. Each of the three light sources 52 is located opposite to the corresponding surface of the color-light synthesis element 51. Each of the concentrator 53 and focusing lenses 54 may be located along the path of distribution of light beams between each of the light sources and the corresponding surface of the color-light synthesis device 51. The concentrators 53 are an optical member for uniformly converging the light beams, for example, a complex parabolic concentrator such as a Winston concentrator, or a focon. In the current embodiment, the three light sources are red, green and blue light sources. However, the present invention is not limited thereto, and a monochromatic light source or various color light sources may be used.

Figure 3:
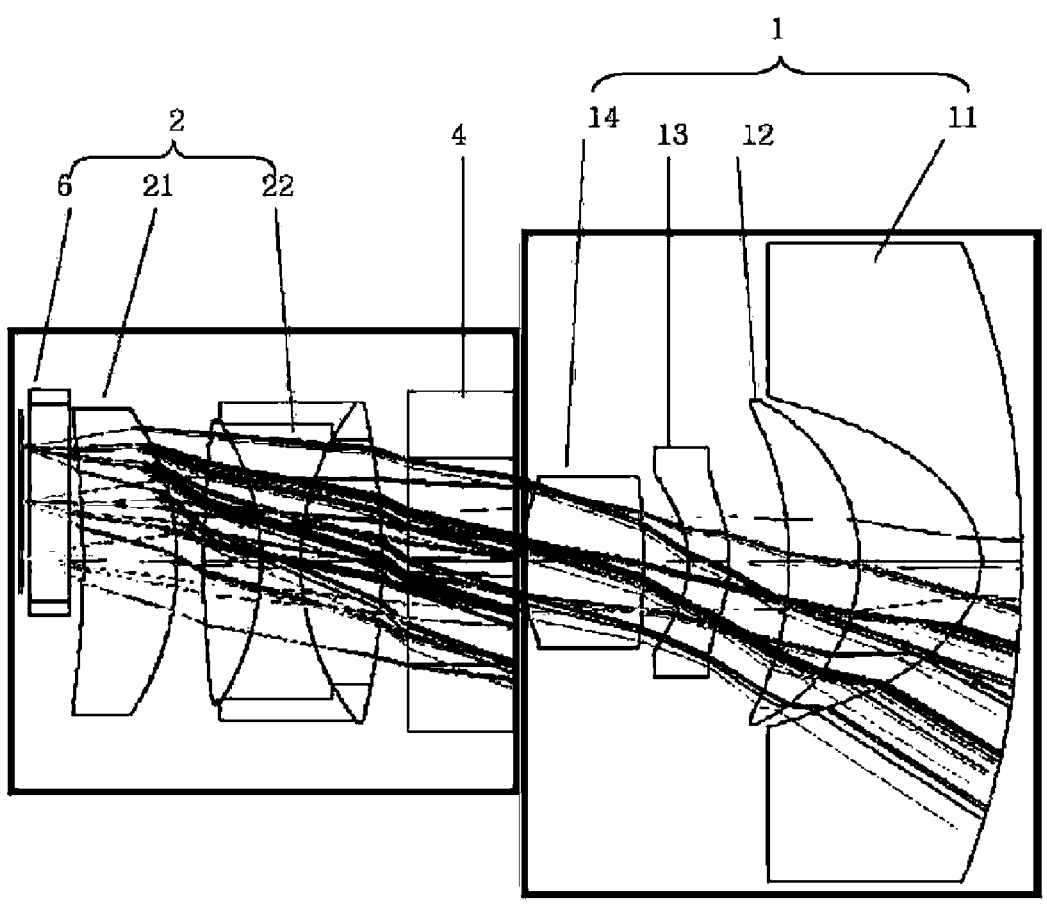
FIG. 3 is a schematic diagram illustrating first and second optical parts illustrated in FIG. 1, according to an embodiment of the present invention.

The first and second optical parts of the projection optical system of FIG. 1 will be described more fully with reference to FIG. 3.

The first optical part 1 may comprise at least one optical lens serially located in the direction of the second optical part 2. In the current embodiment, the first optical part 1 may include a first lens 11, a meniscus lens 12, a second lens 13, and a biconvex singlet lens 14. The first lens 11 is formed of optical plastic and has two aspherical surfaces. The meniscus lens 12 located between the first and second lenses 11 and 13 has a concave surface facing the second optical part 2. The second lens 12 is formed of optical plastic and has two aspherical surfaces.

The second optical part 2 may comprise at least one optical lens located between the micro-mirror element 6 and the deflector 4. Herein, the second optical part 2 may include a triplet lens 22 and a meniscus lens 21 that has a concave surface facing the plane of the micro-mirror element 6.

The operation of the projection optical system according to the present invention will now be described with reference to FIGS. 1 through 3.

A light beam emitted from each of the light sources 52 is incident on a surface of the color-light synthesis element 51, facing each of the light sources 52, via the concentrator 53 and the focusing lens 54. While the light beam passes through the concentrator 53 and the focusing lens 54, the shape and numerical aperture of the light beam are approximately formed. Each path of the light beams emitted from the three light sources 52 becomes a single path of light via the color-light synthesis element 51. The light beam having the single path of light via the color-light synthesis element 51 is adjusted by the adjusting lens 8 to have the required shape and numerical aperture of the light beam in the projection optical system, and then is directed to the deflector 4. The light beam incident on the deflector 4 is reflected from the reflective layer 42 via the prism body 41, and then directed to the second optical part 2 via the prism body 41. The light beam directed to the second optical part reaches the micro-mirror element 6, and then modulated by switching one and off each pixel of the micro-mirror element 6. That is, of the light beams that reach the micro-mirror element 6, light beams reflected from the pixel switched on proceed in the opposite direction along the second optical part 2 and cross the deflector 4. The light beams crossing the deflector 4 then enter the first optical part 1 and are projected on a screen. Of the light beams that reach the micro-mirror element 6, light beams reflected from the pixel switched off do not enter the first optical part 1, thus not being projected on the screen.

The screen in the current embodiment may be widely used. That is, the screen may be screens of projection televisions, conventional screens, fog or waterfall used in laser show, and the like.

The projection optical system according to the present invention may be used in projectors, projection televisions, displays and other devices based on front and rear projection. In addition, the projection optical system can be used in devices that require small in size and high optical efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection optical system comprising:
    a first optical part that comprises at least one optical lens, and projects and displays light beams;
    a second optical part that comprises an image forming element and at least one optical lens, and emits incident light beams as light beams with images; and
    a third optical part that comprises a light source unit and a deflector that is located between the first and second optical parts, such that the deflector reflects light beams emitted from the light source unit to the at least one lens of the second optical part and the light beams with images emitted from the image forming element and through the at least one lens of the second optical part are transmitted through the deflector to the first optical part;
    wherein the second optical part, which comprises at least one optical lens located between the image forming element and the deflector, comprises: a meniscus lens that has a concave surface facing the plane of the image forming element; and a triplet lens.

2. The projection optical system of claim 1, wherein the deflector is an optical prism comprising a transparent prism body and a reflective layer formed on one surface of the surfaces of the prism body.

3. The projection optical system of claim 1, wherein the image forming element is a reflective image forming element.

4. The projection optical system of claim 3, wherein the image forming element is a micro-mirror element or a liquid crystal on silicon (LCOS).

5. The projection optical system of claim 1, wherein the first optical part, which comprises at least one optical lens serially located in a direction of the second optical part, comprises: a first lens that is formed of optical plastic and has two aspherical surfaces; a meniscus lens that has a concave surface facing the second optical part; a second lens that is formed of optical plastic and has two aspherical surfaces; and biconvex singlet lens.

6. The projection optical system of claim 1, wherein the first optical part is in a relocatable form, which can focus images on different working distances.

7. The projection optical system of claim 1, wherein the third optical part further comprises an adjusting lens that is located between the light source unit and the deflector and adjusts shape and numerical aperture of light beams.

8. The projection optical system of claim 1, wherein the light source unit comprises: a plurality of light sources of different colors; and a color-light synthesis element that synthesizes the light beams emitted from the light sources.

9. The projection optical system of claim 8, wherein the color-light synthesis element is an X-cube, and the light sources are red, green and blue light sources, wherein each of the red, green and blue light sources is located opposite to the corresponding surface of the X-cube.

10. The projection optical system of claim 9, wherein the light source unit further comprises a concentrator and a focusing lens that are located between each of the red, green and blue light sources and the corresponding surface of the X-cube.

11. The projection optical system of claim 10, wherein the concentrator is a Winston concentrator.

* * * * *